Dec. 17, 1968 R. E. PACKARD 3,417,375

CIRCUITRY FOR ROTATING FIELDS OF DATA IN A DIGITAL COMPUTER

Filed March 25, 1966 2 Sheets-Sheet 1

INVENTOR.
ROGER E. PACKARD

BY Christie, Parker & Hale
ATTORNEYS

INVENTOR
ROGER E. PACKARD
BY
Christie, Parker & Hale
ATTORNEYS

United States Patent Office 3,417,375
Patented Dec. 17, 1968

3,417,375

CIRCUITRY FOR ROTATING FIELDS OF DATA IN A DIGITAL COMPUTER

Roger E. Packard, Glendora, Calif., assignor to Burroughs Corporation, Detroit, Mich., a corporation of Michigan Filed Mar. 25, 1966, Ser. No. 537,379
5 Claims. (Cl. 340—172.5)

ABSTRACT OF THE DISCLOSURE

A plurality of fields having an identical number of units of data are rotated responsive to a single instruction. During the operation, an address register individual to each field stores its address including a count of the units of data within the field and a computer memory address register addresses the computer memory responsive to the information in the individual address storing registers. Fields are rotated in location unit by unit. First, a data unit of one field is moved to a buffer which serves as the only temporary storage area required in connection with the field rotation operation. Next, the corresponding data unit in each of the other fields is transferred in succession to the place in computer memory left vacant by the corresponding unit of the preceding field in the succession. Finally, the data unit of the first field is moved from the buffer to the place in the computer memory left vacant by the corresponding data unit of the last field in the succession.

This invention relates to high-speed digital computers and, more particularly, to circuitry for effecting rotation of the position of fields of data stored in computer memory.

According to present techniques, the position of a plurality of fields of data stored in computer memory is rotated by first instructing the computer to move one of the fields to a temporary storage area, then instructing the computer to transfer another field into the place in memory left vacant by the first field, then separately instructing the computer to transfer each subsequent field in succession into the place in memory left vacant by the preceding field, and finally instructing the computer to move the first field into the place left vacant by the last field in the succession. Thus, if it is desired to rotate fields A, B, and C, for example, the computer is first instructed to move field A into the temporary storage area. Next, the computer is instructed to transfer field B into the place in memory previously occupied by field A. Next, the computer is instructed to transfer field C into the place in memory previously occupied by field B. Finally, the computer is instructed to move field A from the temporary storage area into the place in memory previously occupied by field C.

In order to rotate three fields, therefore, four individual instructions are required, each consisting of information concerning the operator, the field length, and two addresses. Not only must space in computer memory be provided to store these instructions, but space must be allocated in computer memory for temporarily storing an entire field.

In some computers after an instruction is fetched from computer memory, the addresses in the instruction are first manipulated prior to use in retrieving data from computer memory. Examples of such manipulations in the form of base addition, indexing, and indirect addressing are disclosed in a patent application of William F. Buster and Roger E. Packard entitled "Digital Computer Having High-Speed Branch Operation," filed on even date herewith, identified by Ser. No. 537,572, and assigned to the assignee of the present application. The manipulations performed on the address information before use consume a substantial amount of time. For one thing, indirect addressing manipulations of a single address may be repeated any number of times. Since rotation of three fields requires four instructions, the addresses of each of which may undergo substantial manipulation, its execution requires expenditure of a good deal of time.

According to the invention, circuitry is provided for rotating responsive to a single instruction a plurality of fields having an identical number of units of data. During the operation, an address register individual to each field stores its address including a count of the units of data within the field and a computer memory address register addresses the computer memory responsive to the information in the individual address-storing registers. In response to a command generated by a single field rotation instruction, the fields are rotated in location unit-by-unit. First, a data unit of one field is moved to a buffer which serves as the only temporary storage area required in connection with the field rotation operation. The capacity of the buffer need only be as large as one unit of data. Next, the corresponding data unit of each of the other fields is transferred in succession to the place in computer memory left vacant by the corresponding unit of the preceding field in the succession. Finally, the data unit of the first field is moved from the buffer to the place in computer memory left vacant by the corresponding data unit of the last field in the succession. During rotation of each data unit, the unit count of each address-storing register is advanced prior to beginning rotation of the next data unit.

These and other features of the invention are considered further in the following detailed description taken in conjunction with the drawings in which.

Figure 1:
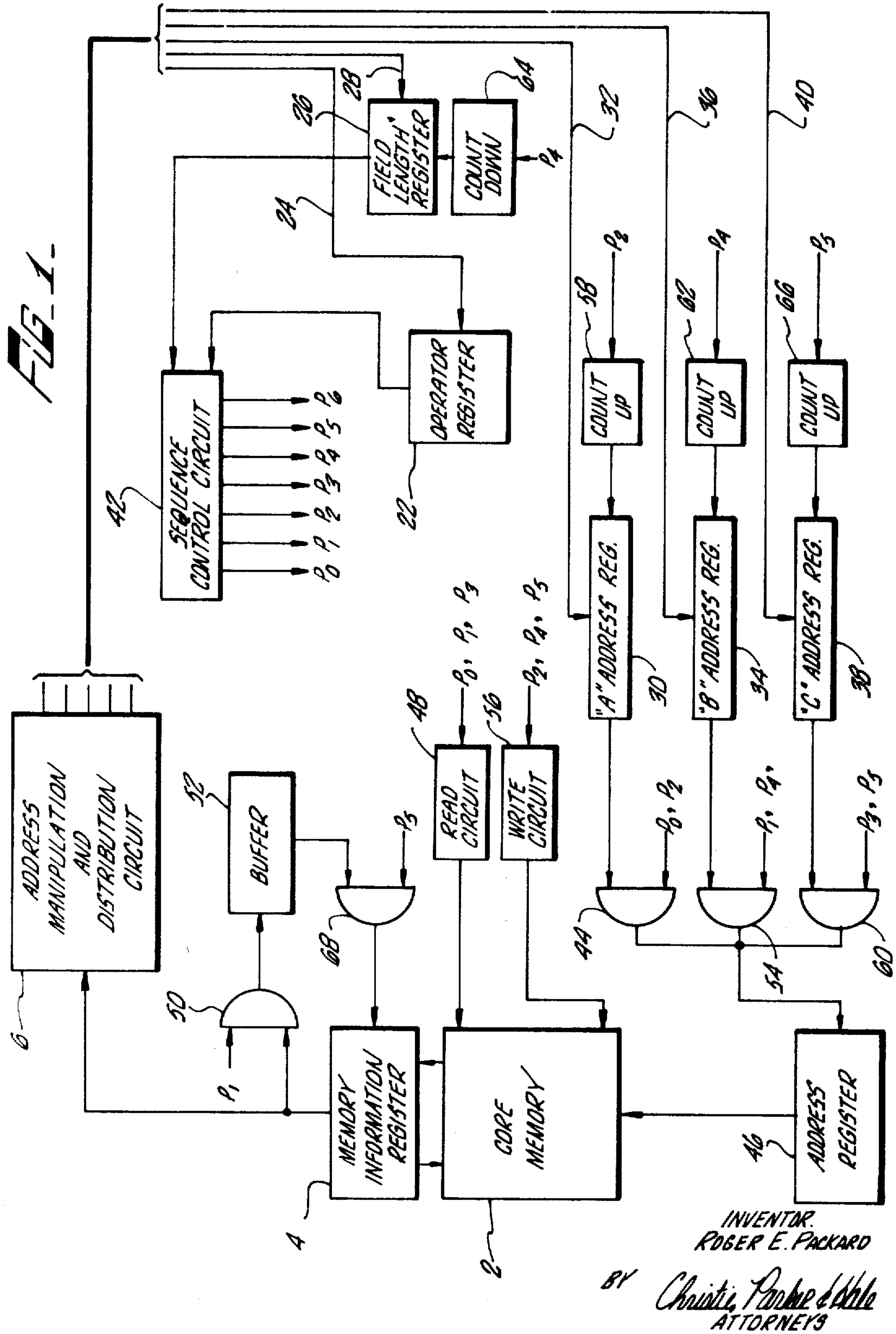
FIG. 1 is a schematic diagram in block form of circuitry arranged according to the invention.
Figure 2:
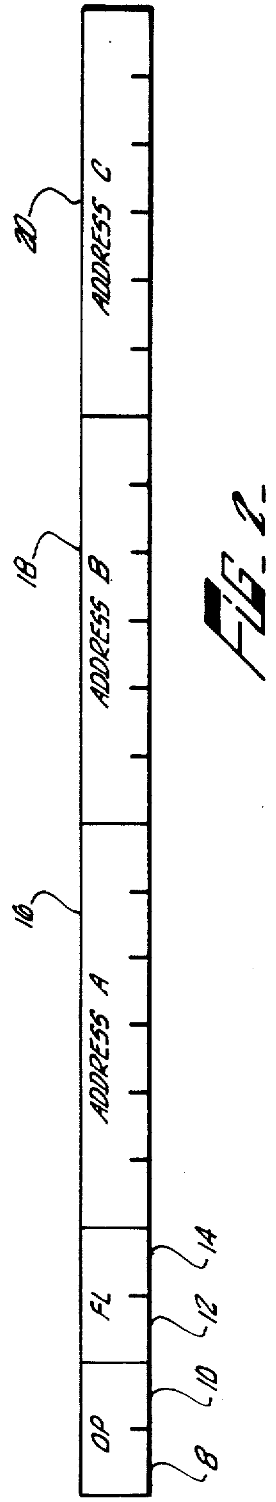
FIG. 2 is a diagram depicting the information contained in an instruction.

Reference is now made to FIG. 1, in which program instructions stored in a core memory 2 serving as computer memory are read out through a memory information register 4. The instructions are fed to an instruction manipulation and distribution circuit 6 in an instruction sequence under the control of computer circuitry that does not form a part of the present invention. As represented in FIG. 2, the field rotation instruction fetched from core memory 2 consists of digits 8 and 10 representing operator information, digits 12 and 14 representing the field length (i.e., the number of units of data in each of the fields to be rotated), a group 16 of digits representing the address of a field A to be rotated, a group 18 of digits representing the address of a field B to be rotated, and a group 20 of digits representing the address of a field C to be rotated. Instruction manipulation and distribution circuit 6, which could contain the circuitry of the above-mentioned application for fetching instructions from core memory 2 in a programmed sequence and for performing manipulations upon the addresses of each fetched instruction, e.g., base addition, indexing, and indirect addressing, senses the presence of the two particular digits of the operator information that represent the field rotation operation. After instruction manipulation and distribution circuit 6 senses the presence of the field rotation operator, it distributes operator digits 8 and 10 to an operator register 22 via a lead 24, field length digits 12 and 14 to a field length register 26 via a lead 28, group 16 of manipulated address digits to an A address register 30 via a lead 32, group 18 of manipulated address digits to a B address register 34 via a lead 36, and group 20 of manipulated address digits to a C address register 38 via a lead 40.

Figure 3:
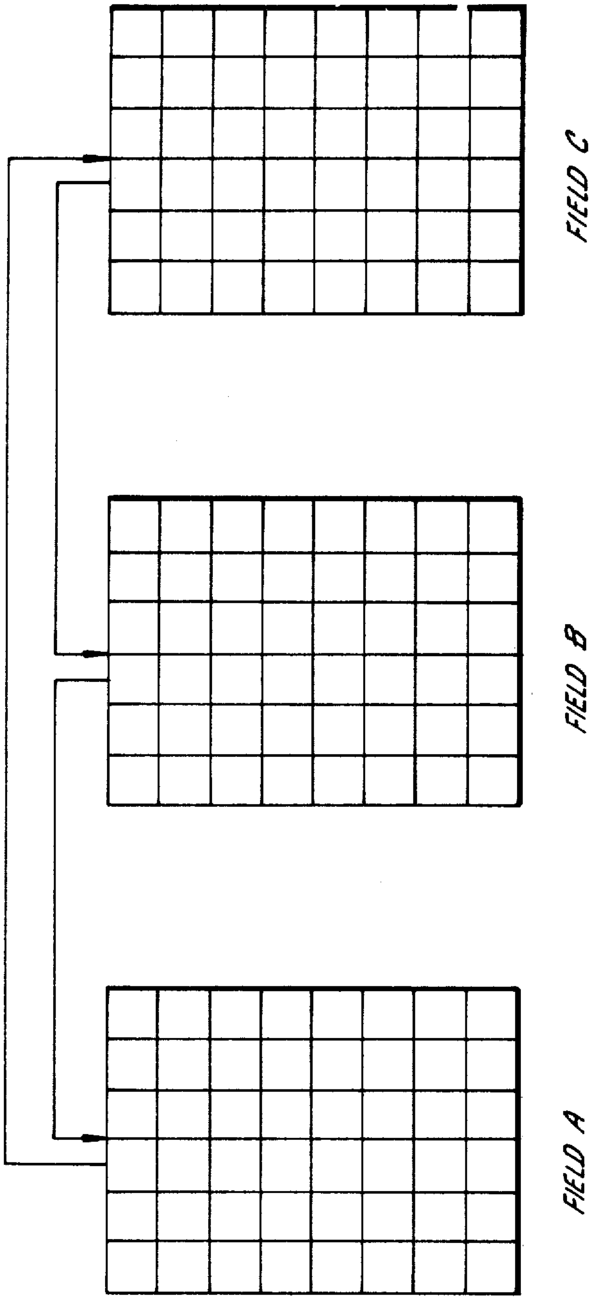
FIG. 3 is a diagram representing three fields of information to be rotated in location.

According to the invention, plural fields of data represented by fields A, B, and C in FIG. 3, which contain units of data represented by the individual blocks in FIG. 3 within fields A, B, and C, are rotated on a unit-by-unit basis. The units can consist of bits, digits, characters, words, or any other quantity of data, depending upon how much data can be written into a read out of computer memory at one time. It is necessary, however, that each field have the same field length, i.e., the same number of data units. Included in the address stored in each of registers 30, 34, and 38, is a unit count, the state of which is 0 at the beginning of the operation.

Upon reception of the field rotation operator in register 22, a command is given to a sequence control circuit 42 to begin operation. Sequence control circuit 42 functions as a central control unit, and typically includes a clock pulse source and a sequence counter by means of which a series of sequential steps is carried out, thereby distributing pulses in a controlled sequence to leads $P_0$ through $P_6$. Sequence control circuit 42 also includes combination gating circuitry which, in response to signals applied thereto, controls the sequence in which pulses are distributed to leads $P_0$ through $P_6$ and controls recycling of the sequence and unit count in registers 30, 34, and 38, as well as generating an indication when the field rotation operation is completed.

Upon distribution of a pulse to lead $P_0$ the A address information including the unit count, is gated through an AND circuit 44 to a computer memory address register 46. The pulse on lead $P_0$ is simultaneously applied to a read circuit 48 having sufficient delay built into it, to permit transfer of the address information first to register 46. After this delay, read circuit 48 generates a read command which is applied to core memory 2. Responsive to the read command, the data unit corresponding to the A address information is transferred to memory information register 4.

Upon distribution of a pulse on lead $P_1$, the data unit of field A stored in memory information register 4 is gated through an AND circuit 50 to a buffer 52 having a capacity sufficient to store one data unit of a field. Simultaneously therewith, the B address information including the unit count is gated through an AND circuit 54 to register 46. The pulse on lead $P_1$ is also applied to read circuit 48, which then generates a delayed read command, thereby transferring the data unit of field B corresponding to the B address information to memory information register 4.

As sequence control circuit 42 progresses to the next step, the A address information responsive to a pulse at lead $P_2$ is again transferred from register 30 through AND gate 44 to register 46. A write circuit 56 having sufficient delay built into it, to permit transfer of the address information to register 46 first, generates a write command after this delay. The data unit of field B stored in memory information register 4 is thereby transferred into the place in core memory 2 left vacant by the data unit of field A, as given by the A address information in the register 46. During the remainder of the rotation sequence of this data unit, the A address information stored in register 32 is not utilized again. As a result, a countup circuit 58 advances the unit count in register 30 from "0" to "1" responsive to the pulse on lead $P_2$.

Upon distribution by sequence control circuit 42 of a pulse to lead $P_3$, the C address information including the unit count is gated through an AND circuit 60 to register 46. Read circuit 48 then generates a delay command, transferring the data unit of field C corresponding to the address information in register 46 to memory information register 4.

As sequence control circuit 42 continues on to distribute a pulse to lead $P_4$, the B address information from register 34 is again transferred through AND gate 54 to register 46. A delayed command is then generated by write circuit 56 responsive to pulse $P_4$, thereby transferring the data unit of field C into the place in core memory 2 left vacant by the data unit of field B, as given by the B address information in register 46. The B address information stored in register 36 is not needed again during the remainder of the rotation sequence of this data unit. Consequently, the unit count in register 34 is advanced by a countup circuit 62 responsive to the pulse on lead $P_4$. Also responsive to the pulse on lead $P_4$ the count stored in field length register 26, which represents the number of data units of fields A, B, and C yet to be rotated at any particular time during the operation, is reduced by "1" by a countdown circuit 64.

Upon distribution of a pulse to lead $P_5$, the C address information stored in register 38 is again gated through AND circuit 60 to register 46 and the data unit of field A temporarily stored in buffer 52 is simultaneously gated through an AND gate 68 to memory information register 4. Responsive to the pulse on lead $P_5$, write circuit 56 then generates a delayed command, thereby transferring the data unit of field A stored in memory information register 4 to the place in core memory 2 left vacant by the data unit of field C, as given by the C address information in register 46. Also responsive to the pulse on lead $P_5$, the unit count in register 38 is advanced by a countup circuit 66.

Although the unit counts in registers 30, 34 and 38 are advanced at different times in the sequence in the illustrative embodiment of the invention, they could be advanced simultaneously at the end of the sequence or individually at some other time in the sequence after the corresponding address information is no longer needed.

At this point rotation of one unit of data from fields A, B, and C is complete. Sequence control circuit 42 recycles and pulses $P_1$ through $P_5$ are sequentially repeated. This procedure continues, thereby rotating fields A, B, and C one unit at a time until the count in field length register 26 is "0." This state indicates that every unit of data of fields A, B, and C has been rotated and the operation is complete.

When field length register 26 indicates a "0" count, this is sensed by sequence control circuit 42 and instead of recycling and repeating pulses $P_0$ through $P_5$, circuit 42 distributes a pulse to lead $P_6$. The pulse on lead $P_6$ indicates to the computer circuitry which controls the instruction sequence that the field rotation operation is complete, and the next instruction in the program is then carried out.

Although the principles of the invention have been illustrated by an operation in which three fields are rotated, the principle utilized by the invention makes it possible to rotate two, three, four, or any other number of fields of information having the same field length, with an attendant saving in operating time and information storage space.

What is claimed is:

1. In a digital data processing system the combination comprising:

(a) memory means for storing binary-coded data including a plurality of fields having an identical number of units of data;

(b) means individual to each field for storing its address including a unit count;

(c) means for addressing the memory means responsive to the information in the address-storing means;

(d) means capable of temporarily storing a data unit of a field;

(e) means for rotating the location of the fields unit-by-unit, the field-rotating means having operative in the time order recited (1) means for moving a data unit of one field to the temporary storing means, (2) means for transferring in succession the corresponding data unit of each of the other fields to the place in the memory means left vacant by the corresponding data unit of the preceding field in the succession, and (3) means for moving the unit of the one field from the temporary storing means to the place in the memory means left vacant by the corresponding data unit of the last field in the succession; and (f) means during rotation of each data unit for advancing the unit count in the address-storing means before the next data unit of the field is rotated.

2. The combination of claim 1 in which the field-rotating means is responsive to a single instruction.

3. In a digital data processing system the combination comprising:

(a) memory means for storing binary-coded data including a plurality of fields having an identical number of units of data;

(b) means individual to each field for storing its address including a unit count;

(c) a memory information register with capacity to accept a data unit of a field from the memory means;

(d) means for addressing the memory means responsive to the information in the address-storing means so as to read a data unit of a field into and write a data unit of a field out of the memory information register;

(e) a buffer with capacity to store a data unit of a field;

(f) means responsive to a single instruction including operator, field length, and field address information for rotating the location of a first data unit of the fields, and thereafter in succession the location of every other data unit of the fields, the field-rotating means having operative during rotation of each unit in the time order recited (1) means for moving a data unit of one field through the memory information register to the buffer, (2) means for transferring in succession the corresponding data unit of the other fields through the memory information register to the place in the memory left vacant by the corresponding data unit of the preceding field in the succession, and (3) means for moving the data unit of the one field from the buffer through the memory information register to the place in the memory means left vacant by the corresponding data unit of the last field in the succession;

(g) means for advancing the unit count in the address-storing means when each data unit of the fields is rotated; and (h) means for sensing when the number of data units of the field equal to the field length of the instruction have been rotated.

4. In a digital data processing system the combination comprising:

(a) a computer memory for storing binary-coded data including fields A, B, and C having an identical number of units of data;

(b) A, B, and C address registers for storing the addresses of fields A, B, and C, respectively, including a unit count of each field;

(c) a memory information register for accepting a unit of a field from computer memory;

(d) a computer memory address register for addressing the computer memory under the control of the information stored in the A, B, and C address registers so as to read a data unit of a field into and write a data unit of a field out of the memory information register;

(e) a buffer capable of storing a data unit of a field;

(f) means responsive to a single instruction consisting of operator, field length, and address information for rotating the location of fields A, B, and C on a unit-by-unit basis, the field rotating means having operative in the time order recited (1) means for moving a data unit of field A through the memory information register to the buffer, (2) means for transferring the corresponding data unit of field B through the memory information register to the place in the computer memory left vacant by the data unit of field A, (3) means for transferring the corresponding data unit of field C through the memory information register to the place in the computer memory left vacant by the corresponding data unit of field B, and (4) means for moving the data unit of field A from the buffer through the memory information register to the place in the computer memory left vacant by the corresponding data unit of field C;

(g) means during rotation of each data unit for advancing the unit count in the A, B, and C address registers before the next data unit of the fields is rotated; and (h) means for sensing the completion of rotation of a number of units equal to the field length of the instruction.

5. The combination of claim 4 in which each data unit of fields A, B, and C is rotated under the control of six time-spaced pulses generated by a sequence circuit which controls field rotation such that:

(a) responsive to the first pulse the information in the A address register is transferred to the computer memory address register and the data unit of field A is then read from computer memory by the memory information register;

(b) responsive to the second pulse the data unit of field A is moved to the buffer, simultaneously therewith the information in the B address register is transferred to the computer memory address register, and the data unit of field B is then read from the computer memory by the memory information register;

(c) responsive to the third pulse the information in the A address register is returned to the computer memory address register and the data unit of field B is then transferred from the memory information register back to the place in computer memory left vacant by the data unit of field A;

(d) responsive to the fourth pulse the information in the C address register is transferred to the computer memory address register and the data unit of field C is then read out of the computer memory by the memory information register;

(e) responsive to the fifth pulse the information in the B address register is transferred to the computer memory address register and the data unit of field C is then written into the place of computer memory left vacant by the data unit of field B; and (f) responsive to the sixth pulse the information in the C address register is transferred to the computer memory address register, simultaneously therewith the data unit of field A stored in the buffer is moved to the memory information register, the data unit of field A is then written into the place of the computer memory left vacant by the unit of data of field C, and the sequence circuit is recycled.

References Cited

UNITED STATES PATENTS

| | | | |
|---|---|---|---|
| 3,374,468 | 3/1968 | Muir | 340—172.5 |
| 2,978,679 | 4/1961 | Dieterich | 340—172.5 |
| 3,226,693 | 12/1965 | Dumey | 340—172.5 |
| 3,228,005 | 1/1966 | Delmege et al. | 340—172.5 |
| 3,311,896 | 3/1967 | Delmege et al. | 340—172.5 |
| 3,319,226 | 5/1967 | Mott et al. | 340—172.5 |

PAUL J. HENON, *Primary Examiner.*